United States Patent [19]

Klemm

[11] 4,175,247

[45] Nov. 20, 1979

[54] ELECTRIC MOTOR CONTROL FOR CONDUCTOR WRAPPING TOOL

[75] Inventor: Robert W. Klemm, Hersey, Mich.

[73] Assignee: Cooper Industries, Inc., Houston, Tex.

[21] Appl. No.: 918,991

[22] Filed: Jun. 26, 1978

[51] Int. Cl.$^2$ ............................................. H02P 3/00
[52] U.S. Cl. ....................................... 318/466; 310/50
[58] Field of Search .......................... 318/466, 17, 468; 140/115, 124; 242/7.17; 310/50, 77

[56] References Cited

U.S. PATENT DOCUMENTS

| | | | |
|---|---|---|---|
| 3,458,793 | 7/1969 | Tsergas | 310/50 |
| 3,564,376 | 2/1971 | Mais et al. | 318/466 |
| 3,654,536 | 4/1972 | Miura | 318/468 |

Primary Examiner—David Smith, Jr.
Attorney, Agent, or Firm—Michael E. Martin

[57] ABSTRACT

A portable conductor wrapping tool having a rotary bit driven by an electric motor includes a motor control circuit in which a switch responsive to a magnetic field is disposed in proximity to a drive spindle for the bit and a magnet mounted on the tool housing. A magnetic flux shunt disposed on the spindle distorts the magnetic field of the magnet as the shunt passes through the field causing the switch to open to deenergize the motor and stop the bit and spindle in a predetermined position. The motor control circuit includes a solid state speed control device and a manually actuated switch which in a first position provides full power to the motor and in a second position supplies reduced power through the magnetic responsive switch.

9 Claims, 4 Drawing Figures

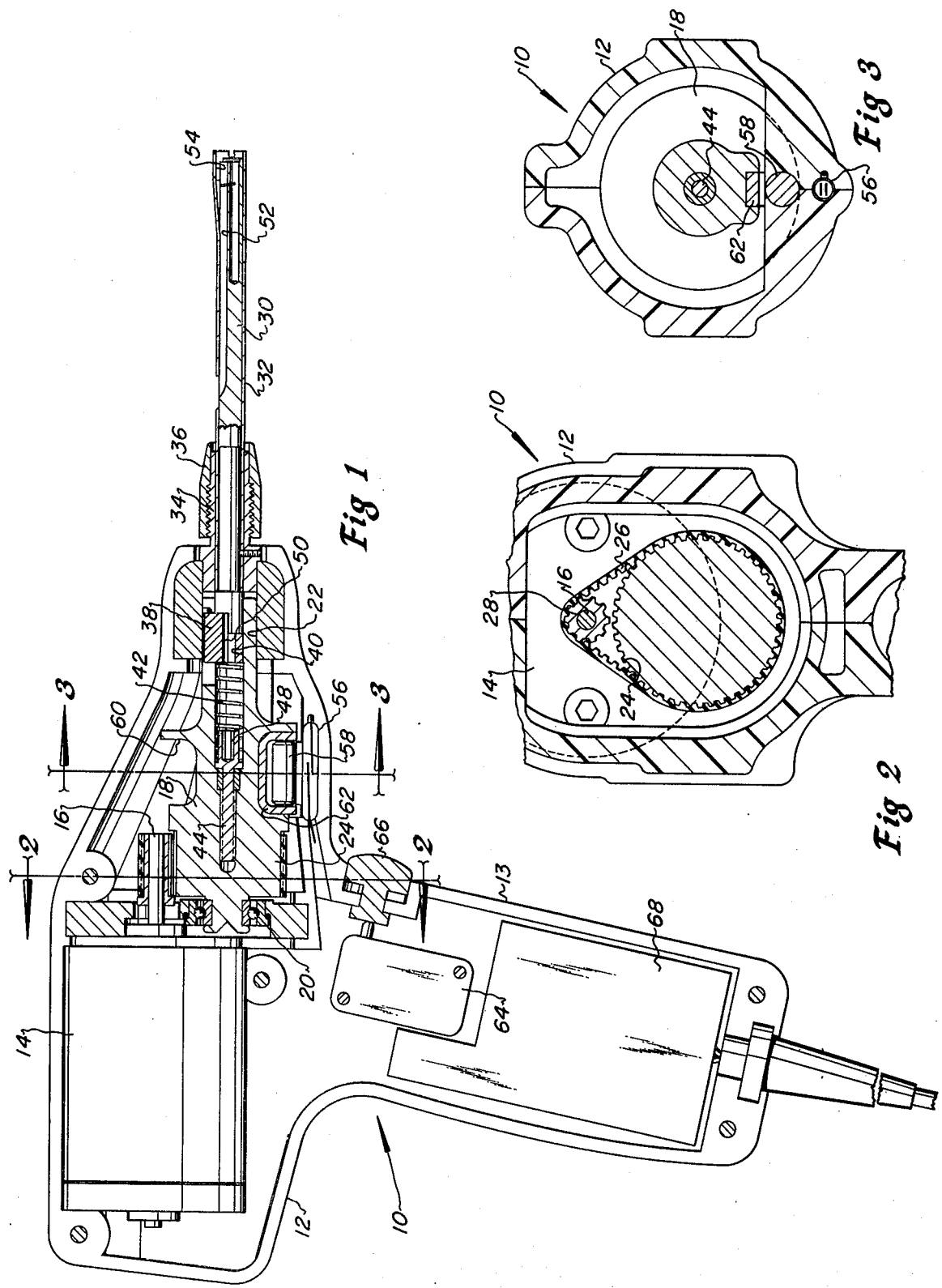

ELECTRIC MOTOR CONTROL FOR CONDUCTOR WRAPPING TOOL

BACKGROUND OF THE INVENTION

This invention pertains to portable electric motor driven tools and in particular tools for wrapping flexible conductor wires around terminal pins.

Various types of power tools which include a rotating work performing member require that the work performing member be returned to a predetermined rotative position after each operating cycle of the tool so that the member is properly oriented for the next operating cycle. In particular, power tools for performing solderless wrapped connections of flexible electrical conductor wire employ a rotary bit which includes a bore or groove opening to the bit end face for receiving the end portion of the conductor which is to be applied to a terminal. Stopping the bit in a predetermined rotative position is desirable to facilitate insertion of the end portion of a conductor wire in the receiving bore or groove prior to each operating cycle. Moreover, some conductor wrapping tools include insulation cutting and stripping devices which require that the rotary bit be in a predetermined position with respect to a surrounding stationary sleeve before the conductor wire is inserted in the receiving bore or groove.

Known devices for positioning the rotary bit of a conductor wrapping tool are the mechanical type such as disclosed in U.S. Pat. No. 3,464,527 to W. J. Baker and the magnetic type disclosed in U.S. Pat. No. 3,243,130 to P. G. Rebechini, et al.

Portable electrically powered tools for wrapping flexible electrical conductor wires have also been contemplated in the prior art. However, certain disadvantages of prior art motor controls and motor physical size have made electric power tools less attractive than pneumatic tools, for example.

SUMMARY OF THE INVENTION

The present invention provides an electrically powered portable tool having an improved motor control circuit in combination with means for stopping a rotating work performing member in a predetermined rotative position. The motor control circuit is easily converted to operate with at least two different electrical source voltages and provides for a compact lightweight tool which is reliable and relatively quiet in operation.

The present invention also provides improved positioning means for a power tool having a rotary work performing member wherein the tool motor is automatically deenergized and the work performing member is stopped in a predetermined position after completion of the tool operating cycle.

The present invention further provides a control circuit for a portable electric motor powered tool which is operable to provide full power to the tool motor when the work cycle is in process, and, upon release of the tool starting switch, provide reduced power to the motor until the motor is automatically deenergized when the work performing member is in proximity to its predetermined stopped position.

The present invention still further provides positioning means for a rotary member in an electric motor powered tool wherein a magnet is operable to effect a switching signal to shut off the motor and effect the stopping and holding of the rotary member in a predetermined position by magnetic force.

Further advantages and superior features of the present invention will be appreciated by those skilled in the art upon reading the following detailed description.

BRIEF DESCRIPTION OF THE DRAWINGS

FIG. 1 is a longitudinal side elevation, in section of a conductor wrapping tool including the present invention;

FIG. 2 is a section view taken along the line 2—2 of FIG. 1;

FIG. 3 is a section view taken along the line 3—3 of FIG. 1; and,

DESCRIPTION OF THE PREFERRED EMBODIMENT

Figure 4:
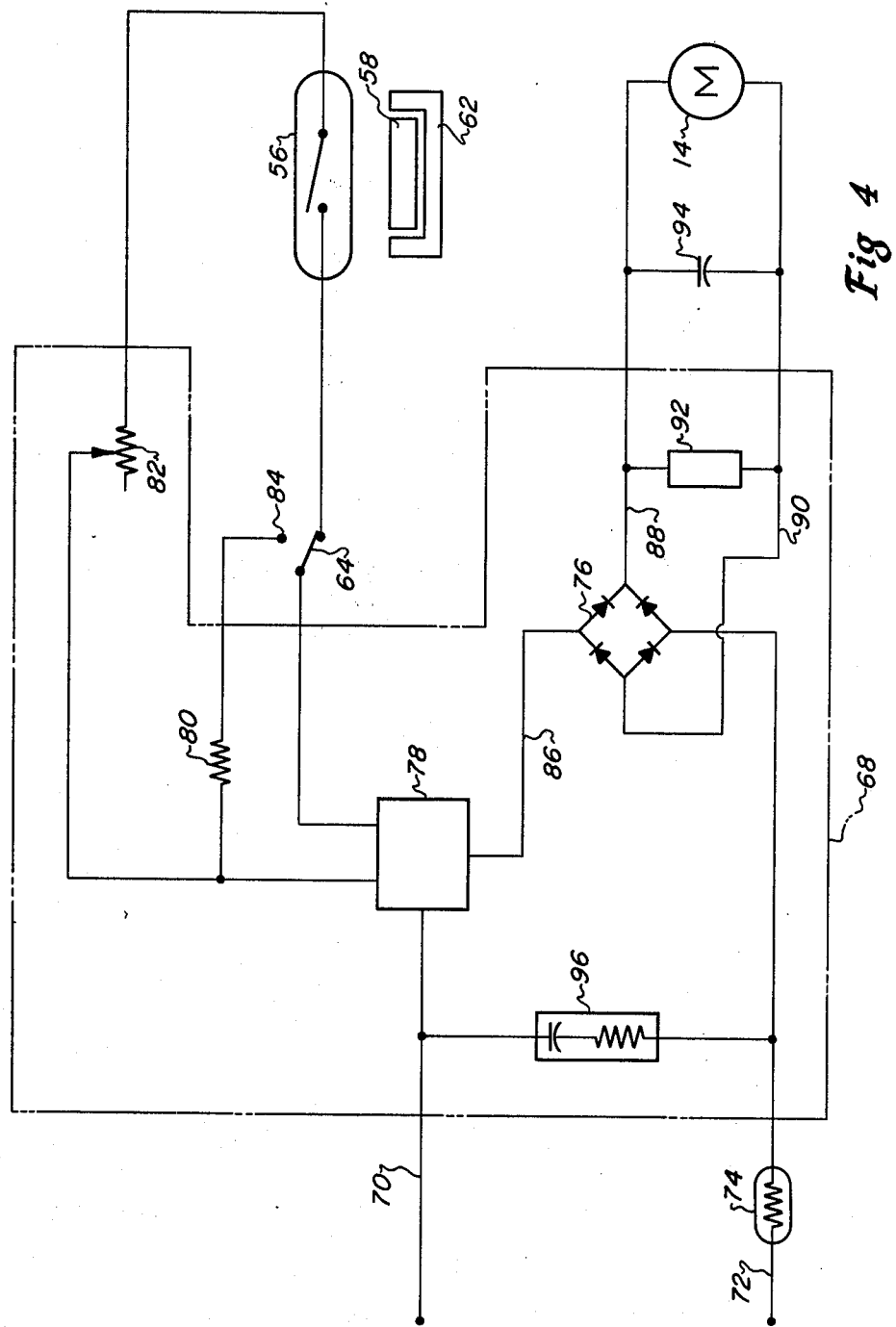
FIG. 4 is a schematic diagram of the control circuit of the present invention.

Referring to FIG. 1 of the drawings there is shown a portable electric motor powered tool 10 for making solderless electrical connections with flexible conductor wire by mechanically coiling the wire around a terminal pin. The tool 10 includes a housing 12 which may be formed of separable longitudinal halves joined together in a conventional manner and includes a depending handle portion 13. An electric motor 14 is disposed in the housing 12 and is preferably a variable speed direct current type adapted to operate at a maximum input of 120 volts d.c. The motor 14 includes a rotor 16 which is drivably connected to a rotary spindle 18. The spindle 18 is mounted in suitable bearings 20 and 22 and includes an integral toothed sprocket portion 24. Referring to FIG. 2 also, the sprocket portion 24 is engaged with an endless toothed belt 26 which is driven by a sprocket 28 mounted on the motor rotor 16.

The spindle 18 is adapted to rotatably drive an elongated work performing member comprising a conductor wrapping bit 30 which is retained in a stationary sleeve 32 secured to the tool housing by a collet 34 and nut 36. The rotary bit 30 is keyed to the spindle 18 for rotation therewith by an axially movable drive key 38 disposed in a bore 40 in the spindle. The drive key 38 is biased toward the collet 34 by a coil spring 42 disposed in the spindle 18. An axial biasing force exerted on the bit 30 by the spring 42 may be adjusted by positioning a threaded member 44 axially in the spindle bore. The member 44 includes a head portion having a polygonal recess 48 therein. A suitable wrench may be inserted through a bore 50 in the key 38, with the bit 30 removed from the tool, to adjust the axial position of the member 44 and the force exerted on the key by the spring 42. The axial biasing force on the bit 30 is desirably adjusted in accordance with the gage or diameter of the conductor wire being worked by the bit to prevent wrapping of the wire coils over each other during the coiling process.

As shown in FIG. 1 the rotary bit 30 includes an elongated groove 52 which is disposed offset from the axis of rotation of the bit and in the at-rest position is aligned with a recess 54 in the sleeve 32 to facilitate insertion of a flexible conductor wire or the like into the groove in a known way. Accordingly, it is desirable that after each operating cycle of the tool 10 the bit be stopped in the predetermined rotative position shown in FIG. 1.

Referring to FIGS. 1 and 3 the tool 10 is provided with improved means for stopping the spindle 18 and the bit 30 in the predetermined position referred to above. The tool 10 includes a normally open switch 56 which is preferably of the dry reed magnetic responsive type and is disposed in the housing 12 closely adjacent to a permanent magnet 58. The magnet 58 develops a magnetic field the intensity of which normally maintains the switch 56 in a closed condition due to the proximity of the switch to the magnet itself. The spindle 18 includes a substantially annular recess 60 in which is mounted a somewhat U-shaped member 62 made of a ferromagnetic material such as low carbon steel. When the spindle 18 is in the rotative position shown in FIGS. 1 and 3 the magnetic field of the magnet 58 is distorted or shunted through the member 62. Accordingly, the change in the intensity of the magnetic field sensed by the switch 56 will result in the switch moving to the open position. Moreover, the magnetic force exerted on the member 62 by the magnet 58 biases the spindle 18 and the bit 30 to stop in the position shown in FIGS. 1 and 3.

The switch 56 is part of a motor control circuit shown schematically in FIG. 4 and described in further detail hereinbelow. Referring again to FIG. 1, the tool 10 includes a manually actuated control switch 64 disposed in the housing 12 and actuatable by a trigger 66. The handle portion 13 also includes a circuit board 68 on which some of the circuit components shown in FIG. 4 are disposed. The switch 56 is operable on being moved from the closed to the open position with the trigger 66 released to effect deenergization of the motor 14. Accordingly, when the operating cycle of the tool 10 is completed the motor control circuit shown in FIG. 4 is operable to deenergize the motor when the spindle 18 is in the predetermined stopped position, and the magnet 58 also biases the spindle in the predetermined stopped position due to the magnetic force acting on the member 62.

Referring to FIG. 4 the diagram shown includes the circuit board 68 which is supplied with an a.c. (alternating current) voltage by way of the conductors 70 and 72 from a course, not shown. The tool 10 is adapted to operate on a supply voltage of 240 volts a.c. However, the control circuit is general and the motor 14 are adapted for 120 volt operation. Therefore, for 240 volt operation a resistor 74 is inserted in the conductor 72 to effect a reduction in the input voltage to the control circuit to 120 volts a.c. This arrangement has the advantage that a smaller motor may be used with a power source of 240 volts a.c. If the power source is 120 volts a.c. the resistor 74 may be eliminated. The conductor 72 is connected to one input terminal of a bridge type rectifier 76 for converting the electrical energy source to d.c. (direct current) for the motor 14.

The conductor 70 is connected to the line input terminal of a motor speed control device generally designated by the numeral 78. The speed control device 78 is preferably a semiconductor type which provides for substantially full wave voltage control and which includes a device known in the art of electronic controls as a triac. The particular speed control device referred to in FIG. 4 is a model TSCC-12 Speed Control manufactured by ECC Corporation, Euless, Texas, U.S.A. The speed control device 78 has been modified from the infinitely variable speed control capability of the above mentioned commercially available device by inclusion of a speed regulation circuit including the switches 56 and 64, a resistor 80, and a variable resistor 82. In the operation of the tool 10 the normal motor free speed during tool operation is controlled to be approximately 3500 rpm and the switch 64 is engaged with the contact 84. When the trigger 66 is released the switch 64 moves to its alternate position shown in FIG. 4 to close the circuit through the switch 56 and the resistor 82 which results in a substantial reduction in the speed of the motor 14, preferably to about 200 rpm for the tool 10. The resistor 82 has a higher resistance value than the resistor 80 and furthermore is adjustable so that the low speed operation of the tool can be set to overcome differences in friction losses and the like from one tool to the next. When the switch 56 is open the speed control 78 shuts off the motor 14.

The output lead 86 from the speed control device 78 is also connected to the rectifier 76. The rectifier 76 converts the electrical energy input to the motor 14 to a direct current signal in a known way which is transmitted to the motor by way of the conductors 88 and 90. The d.c. portion of the motor control circuit may include a varistor 92 for limiting the peak voltage imposed on the motor 14 and a capacitance type filter 94 for reducing fluctuations in the d.c. voltage signal imposed on the motor. The a.c. input conductors 70 and 72 may be interconnected by way of a resistance-capacitance type filter 96 to substantially reduce any irregularities in the characteristics of the a.c. input voltage signal.

As may be appreciated from the foregoing, the motor control circuit of the present invention provides improved means for stopping the rotary bit 30 of the tool 10 in a predetermined position and for automatically shutting off the tool motor. When the switch 64 is moved to engage the contact 84, FIG. 4, the speed control device 78 is operable to provide an input voltage waveform to the rectifier 76 which results in normal high-speed rotation of the motor for operating the bit 30 to perform its work function. The switch 56 is biased in the closed position by the substantially continuous magnetic force exerted thereon. However, when the trigger 66 is released the switch 64 is spring returned to the position shown in FIG. 4 whereby the circuit including the switch 56 and the resistor 82 causes the speed control device 78 to substantially reduce the motor and spindle speed. When the spindle 18 is rotating at the reduced speed the magnetic field of the magnet 58 will be shunted substantially through the member 62 as it moves into proximity to the magnet whereby the switch 56 will be opened to effect shutoff of current flow to the motor by way of the speed control device 78. The magnet 58 is strong enough to arrest rotation of the spindle in the predetermined position of the bit 30 as shown in FIG. 1.

If the inertia of the motor 14, spindle 18 and bit 30, at low speed, should carry the member 62 slightly past the magnet 58, the force exerted on the member will cause the spindle to return to the position shown in FIG. 1 when the motor is deenergized. If the inertia of the rotating elements should move the member 62 far enough away from the magnet to allow the magnetic field to again bias the switch 56 closed, the motor will be energized at reduced speed momentarily to rotate the member 62 into position again where shunting of the magnetic field will cause the switch 56 to open thereby deenergizing the motor and stopping the bit in the predetermined position.

What is claimed is:

1. In a power tool including a housing, a rotary work performing member rotatably mounted in said housing, an electric motor drivably connected to said work performing member, and conductor means for connecting said motor to a source of electrical energy, the improvement which includes:

a motor control circuit connected to said conductor means and including first means for causing said motor to be operated at a first speed and a second speed less than said first speed;

a magnet mounted in said housing and operable to generate a magnetic field;

second means in said control circuit responsive to a change in the intensity of said magnetic field when said motor is operating at said second speed to cause said motor to be deenergized; and, a member made of a magnetic material disposed to be rotated together with said work performing member and operable in a predetermined rotative position in proximity to said magnet to change the intensity of the magnetic field thereby causing said second means to deenergize said motor, said member further being responsive to a magnetic force acting thereon to bias said work performing member in said predetermined rotative position.

2. The invention set forth in claim 1 wherein:

said second means comprises a switch disposed in said housing and operable in response to a change in the intensity of said magnetic field sensed by said switch to move from a closed position to an open position to deenergize said motor.

3. The invention set forth in claim 2 wherein:

said switch comprises a dry reed normally open switch responsive to the presence of a magnetic force to be in a closed position.

4. The invention set forth in claim 1 wherein:

said first means includes a speed control device operable to vary the electric power supplied to said motor to control the speed thereof; and said motor control circuit includes a first switch in circuit with said speed control device and operable in a first position to cause said motor to operate at said first speed and in a second position to cause said motor to operate at said second speed.

5. The invention set forth in claim 4 wherein:

said tool includes a manually actuated trigger for moving said first switch to said first position in response to actuation of said trigger by the tool operator, said first switch being movable to said second position in response to the release of said trigger.

6. The invention set forth in claim 4 wherein:

said speed control device includes a regulation circuit including said first switch and said second means includes a second switch disposed in said regulation circuit and operable to cause said motor to be deenergized when said first switch is in said second position.

7. The invention set forth in claim 6 wherein:

said regulation circuit includes a first resistor in series with said first switch when said first switch is in said first position, and a second resistor in series with said first switch and said second switch when said first switch is in said second position, and the resistance of said second resistor is greater than said first resistor.

8. The invention set forth in claim 7 wherein:

said second resistor includes means for varying its resistance whereby the second speed of the motor may be set at a predetermined value.

9. The invention set forth in claim 1 together with:

a resistor interposed in said conductor means between said motor control circuit and said source of electrical eneregy for reducing the voltage of the electrical energy supplied to said motor control circuit.

* * * * *